Dec. 5, 1944.  F. R. MARTIN  2,364,303

SPRING TOOTH AND CLIP ASSEMBLY

Original Filed Dec. 19, 1941

INVENTOR.
FLOYD R. MARTIN
BY
ATTORNEYS.

Patented Dec. 5, 1944

2,364,303

UNITED STATES PATENT OFFICE 2,364,303

SPRING TOOTH AND CLIP ASSEMBLY

Floyd R. Martin, East Moline, Ill., assignor to Deere & Company, Moline, Ill., a corporation of Illinois Original application December 19, 1941, Serial No. 423,648. Divided and this application April 3, 1943, Serial No. 481,780

14 Claims. (Cl. 56—400)

The present invention relates generally to securing clips and more particularly to clips for securing spring tooth members on the endless conveyor belt of a windrow pickup device. The principal object of my invention relates to the provision of a securing clip which is simple and inexpensive to manufacture, but which efficiently secures a pickup tooth to the belt and prevents the tooth member from twisting relative to the belt while permitting free springing of the tines when the latter encounter obstructions during operation in the field. A further object of my invention relates to the provision of a clip and spring tooth assembly which combine to provide an efficient pickup unit for a belt type pickup device.

This application is a division of an application Serial No. 423,648 filed December 19, 1941, by Louis A. Paradise, James V. Irwin, and Floyd R. Martin now Patent No. 2,347,926, granted May 2, 1944.

These and other objects in advantages of my invention will be apparent to those skilled in the art after a consideration of the following description, in which reference is had to the drawing appended hereto, in which Figure 1 is a plan view of a fragment of an endless conveyor belt, on which is secured a spring tooth and clip assembly embodying the details of the present invention;

Figure 1:
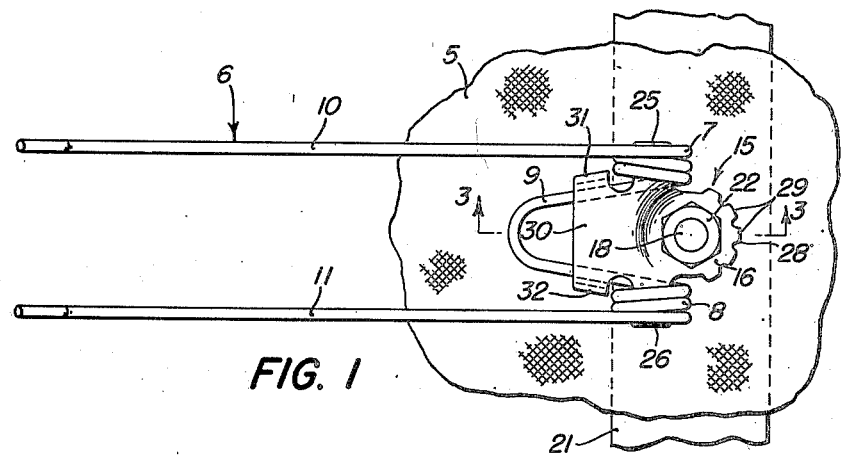
Figure 2:
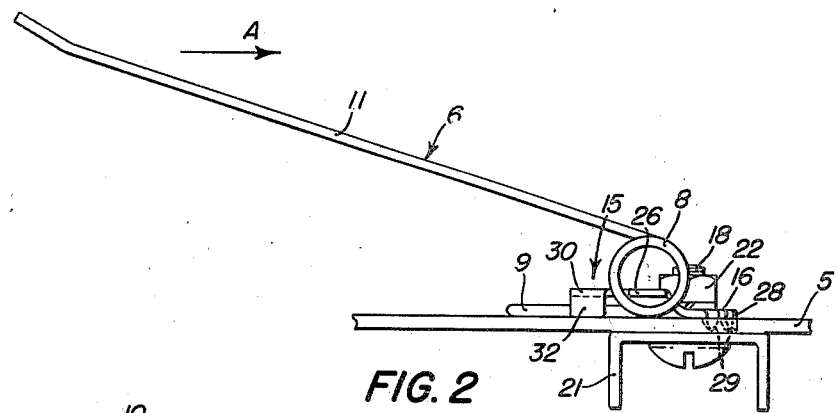
Figure 2, is a side elevational view of the assembly.
Figure 3:
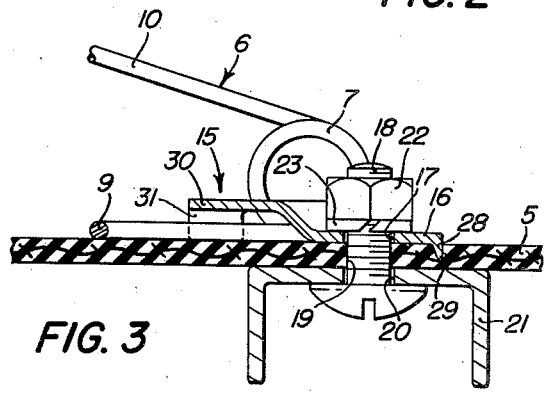
Figure 3 is a sectional elevational view taken along the line 3—3 in Figure 1 and drawn to an enlarged scale.

Referring now to the drawing, the pickup device is represented by a fragment of flexible conveyor belting, indicated by reference numeral 5, preferably a rubberized fabric although other material can be employed, as is well known to those skilled in the art. Secured to the belt 5, is a spring tooth member indicated generally by reference numeral 6, it being understood that the belt is provided with a plurality of rows of these tooth members, as described in detail in the above mentioned co-pending application.

The tooth member 6 comprises a spring wire in the form of a pair of spaced coaxial coils 7, 8, interconnected by a U-shaped loop 9, and having a pair of tines 10, 11, extending from the outer ends of the coils, in the same direction as the loop 9, but spaced above the latter by virtue of the fact that the tines are tangent to the coils at points substantially diametrically opposite from the ends of the loop 9. Thus the tines 10 and 11 are normally generally parallel with the surface of the belt 5 but bend slightly outwardly therefrom.

The tooth member is attached to the belt by means of a securing clip indicated generally by reference numeral 15, which comprises a central recessed portion 16 adapted to lie against the belt 5 and having an aperture 17 adapted to receive a securing bolt 18, which passes through an aligned hole 19 in the belt 5 and also through an opening 20 in a transverse channel shaped slat member 21, disposed beneath the belt 5 as described in detail in the above-identified co-pending application. This slat 21 is not an essential part of the present invention, for the spring tooth and clip assembly shown and described herein can be used without the slat 21, secured to the belt alone, as described in detail in Patent 2,253,797, granted August 26, 1941, to Melroe.

The belt 5 is secured between the clip 15 and the channel shaped slat 21 by means of a nut 22 on the bolt 18, the nut being locked by a lock washer 23.

The clip 15 is provided with a pair of laterally extending wing portions 25, 26, extending from opposite sides of the central section 16, received by the coils 7, 8, respectively, which encircle the wings 25, 26 in assembled relation. The coils are placed over the wings by spreading the U-shaped loop 9 apart until the coils can be placed over the ends of the wings.

One end of the central section 16 is formed in an arc about the center of the bolt aperture 17 and has a downwardly turned flange 28, which is notched to provide an arcuate row of teeth 29. The teeth are sharpened to cause them to imbed themselves into the belt 5, when the nut 22 is tightened on the bolt 18. These teeth prevent the spring tooth member 6 and clip 15 from rotating about the axis of the bolt 18 during operation. The clip is provided with a longitudinally extending body 30 opposite the toothed flange 28, which overlies the U-shaped loop 9 and has a pair of downwardly turned flanges 31, 32, straddling the loop. The body portion 30 and wings 25, 26 are offset outwardly from the central section 16 to provide space between the body 30 and the belt 5 for the loop 9. The flanges 31 and 32 bear upon the surface of the belt and serve to space the body portion 30 of the clip with a slight clearance above the loop 9, to permit a small amount of vertical movement of the loop during operation.

It will be evident that the spring tooth member 6 is loosely secured to the belt, but is effectively prevented from being dislodged from the clip by means of the flanges 31 and 32, which secure the loop against spreading after the bolt is tightened. In operation, the belt and tooth move in the direction of the arrow indicated at "A", with the tines 10, 11 in a trailing relation. The tines are adapted to brush the ground as they pass around the front roller of the pickup device, at which time the tines yield toward the belt, thereby stressing the spring coils 25 and 26, the reaction of which is transmitted by the loop 9 to the surface of the belt. When the teeth leave the ground, they spring outwardly once more and the inertia due to this movement lifts the loop 9 away from the surface, but the body portion 30 limits the amount of the upward swinging movement of the loop 9 about the axis of the coils 25 and 26. The small amount of play between the loop 9 and the body portion 30 serves to damp the oscillations of the tines 10 and 11 as the latter are released from ground engaging relation.

I do not intend my invention to be limited to the exact details shown and described herein, except as set forth in the following claims.

I claim:

1. For use in a windrow pick-up device comprising an endless conveyor and a spring tooth member having a pair of spaced coaxial coils and tangentially extending tines, a securing clip for said tooth member comprising a metal piece having a central apertured section adapted to receive a bolt for attaching said clip to said conveyor, a pair of laterally extending wings on opposite sides of said central section adapted to be received by said coils, respectively, and a longitudinally extending body portion between said wings.

2. For use in a windrow pick-up device comprising an endless conveyor and a spring tooth member having a pair of spaced coaxial coils and tangentially extending tines, a securing clip for said tooth member comprising a metal piece having a central apertured section adapted to receive a bolt for attaching said clip to said conveyor, a pair of laterally extending wings on opposite sides of said central section adapted to be received by said coils, respectively, and a longitudinally extending body portion having a downwardly turned spacing flange adjacent the end opposite said apertured section and adapted to bear upon said conveyor.

3. For use in a windrow pick-up device comprising a flexible belt and a spring tooth member having a pair of spaced coaxial coils connected by a loop and tangentially extending tines, a securing clip for said tooth member comprising a central apertured section adapted to receive a bolt for attaching said tooth member to said belt, a pair of laterally extending wings on opposite sides of said central section adapted to be received by said coils, respectively, a longitudinally extending body adapted to engage a portion of said loop to prevent the tooth member from swinging upwardly, and a downwardly turned toothed flange at one end of said central section adapted to engage said belt.

4. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt, a pair of laterally extending wings on opposite sides of said central section adapted to be received by said coils, respectively, and a longitudinally extending body portion lying over a portion of said loop to prevent said tooth member from swinging upwardly about the axis of said coils.

5. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt, a pair of laterally extending wings on opposite sides of said central section adapted to be received by said coils, respectively, and a longitudinally extending body portion lying over a portion of said loop, said body portion having a pair of downwardly turned flanges straddling said loop and adapted to bear upon the supporting belt.

6. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt, a pair of laterally extending wings on opposite sides of said central section adapted to be received by said coils, respectively, a longitudinally extending body portion lying over a portion of said loop and holding the tooth member against swinging upwardly, and a downwardly turned toothed flange at one end of said central portion for preventing rotation thereof about said bolt.

7. For use in a windrow pick-up device comprising an endless conveyor and a spring tooth member having a pair of spaced coaxial coils and tangentially extending tines, a securing clip for said tooth member comprising a metal piece having a central apertured section adapted to receive a bolt for attaching said clip to said conveyor, a pair of laterally extending wings on opposite sides of said central section adapted to be received by said coils, respectively, a downwardly turned toothed flange along one edge of said central section between said wings adapted to engage the conveyor, and a longitudinally extending body portion on the opposite side of said central section having a downwardly turned spacing flange adjacent the outer end thereof adapted to bear upon the conveyor.

8. For use in a windrow pick-up device comprising an endless conveyor and a spring tooth member having a pair of spaced coaxial coils and tangentially extending tines, a securing clip for said tooth member comprising a metal piece having a central apertured section adapted to receive a bolt for attaching said clip to said conveyor, a pair of laterally extending wings on opposite sides of said central section adapted to be received by said coils, respectively, and flanged portions on opposite sides of said central section between said wings, the flanges on said portions being turned downwardly to bear upon said conveyor.

9. The combination set forth in claim 8 including the further provision of teeth on certain of said downwardly turned flanges adapted to engage the conveyor to prevent rotation of said clip about the axis of the attaching bolt.

10. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt, a pair of laterally extending wings on opposite sides of said central section adapted to be received by said coils, respectively, and a downwardly turned toothed flange on said central section between said wing adapted to engage the belt to prevent angular displacement of said clip about the axis of the attaching bolt.

11. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt, a pair of laterally extending wings on opposite sides of said central section adapted to be received by said coils, respectively, a longitudinally extending body portion lying over a portion of said loop and holding the tooth member against swinging upwardly, said body portion having a downwardly turned spacing flange near the outer end thereof adapted to bear against the belt adjacent the loop to provide clearance between the latter and said body portion, and a downwardly turned toothed flange on said central section opposite said body portion adapted to engage the belt to prevent angular displacement of said clip about the axis of the attaching bolt.

12. For use in a windrow pick-up device comprising an endless conveyor and a spring tooth member having a pair of spaced coaxial coils and tangentially extending tines, a securing clip for said tooth member comprising a metal piece having a central apertured section adapted to lie flat against the conveyor and to receive a bolt for attaching said clip to said conveyor, a pair of laterally extending wings on opposite sides of said central section adapted to be received by said coils, respectively, and a longitudinally extending body portion having a downwardly turned spacing flange adjacent the end opposite said apertured section and adapted to bear upon said conveyor, said wings and body portion being offset outwardly from said belt and said central section.

13. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt with said central section secured rigidly against the belt, a pair of laterally extending wings on opposite sides of said central section adapted to be received by said coils, respectively, a longitudinally extending body portion lying over a portion of said loop and holding the tooth member against swinging upwardly, and a downwardly turned toothed flange at one end of said central portion for preventing rotation thereof about said bolt, said central section being offset below said wings and body portion to space the latter away from the belt surface to provide a limited amount of movement of said loop between said body portion and the belt.

14. In combination, a spring tooth member of the class described comprising a spring wire in the form of a pair of spaced coaxial coils connected by a U-shaped loop, and a pair of tines on the outer ends of said coils extending tangentially thereto over said loop, and a securing clip for said tooth member comprising a central apertured section adapted to receive a bolt for attaching said tooth member to a belt with said central section secured rigidly against the belt surface, a pair of laterally extending wings on opposite sides of said central section adapted to be received by said coils, respectively, a longitudinally extending body portion lying over a portion of said loop and holding the tooth member against swinging upwardly, said body portion being offset outwardly from said central section and having a downwardly turned spacing flange near the outer end thereof adapted to bear against the belt adjacent the loop to provide clearance between the latter and said body portion, and a downwardly turned toothed flange on said central section opposite said body portion adapted to engage the belt to prevent angular displacement of said clip about the axis of the attaching bolt.

FLOYD R. MARTIN.